April 22, 1952  J. M. GOLDBERG  2,593,749
FISHING REEL
Filed Dec. 5, 1949

INVENTOR.
BY JACOB M. GOLDBERG
Bertha L. MacGregor
Attorney

Patented Apr. 22, 1952

2,593,749

UNITED STATES PATENT OFFICE 2,593,749

FISHING REEL

Jacob M. Goldberg, Denver, Colo.

Application December 5, 1949, Serial No. 131,205

3 Claims. (Cl. 242—84.5)

This invention relates to fishing reels and particularly to improvements in the type of fishing reel shown and described in my co-pending application, Serial No. 123,278, filed October 24, 1949, now Patent No. 2,587,462, dated February 26, 1952, of which this application is a continuation-in-part.

The fishing reel disclosed in my said application is provided with a slotted housing through which the line can be withdrawn, a line control member hingedly mounted on the housing, a drive gear operatively connected with the spool which carries the line, gear locking means mounted in the housing, and a cam actuated by the hinged line control member for moving said gear locking means into and out of gear engaging position. Thus the user of the reel manually actuates the hinged line control member to either casting or retrieving position, and the actuation of said hinged control member automatically actuates the cam which allows the gear locking means to engage the spool driving gear to prevent rotation thereof during the casting operation or forces the gear locking means to disengage the spool driving gear and allow rotation of the gear and spool during the retrieving operation.

The present invention has been applied to a fishing reel of the character described. It comprises mechanism for preventing tangling or coiling up of the line inside of the reel housing, between the spool and slotted housing cover through which the line emerges. This additional line control mechanism includes a pivoted arm which is automatically actuated by the manually operable hinged control member heretofore described in said co-pending application. When the hinged control member is put into the line retrieving position, the pivoted control arm is moved automatically into spool engaging position in such manner that the line cannot uncoil from the spool and become tangled or coiled up inside of the reel housing. When the hinged control member is put into the line casting position, the pivoted control arm of this invention is moved automatically out of spool engaging position, thus allowing the line to uncoil from the spool without interference for free frictionless casting.

The advantages of this improvement will be apparent from the drawings and following description.

Figure 1:
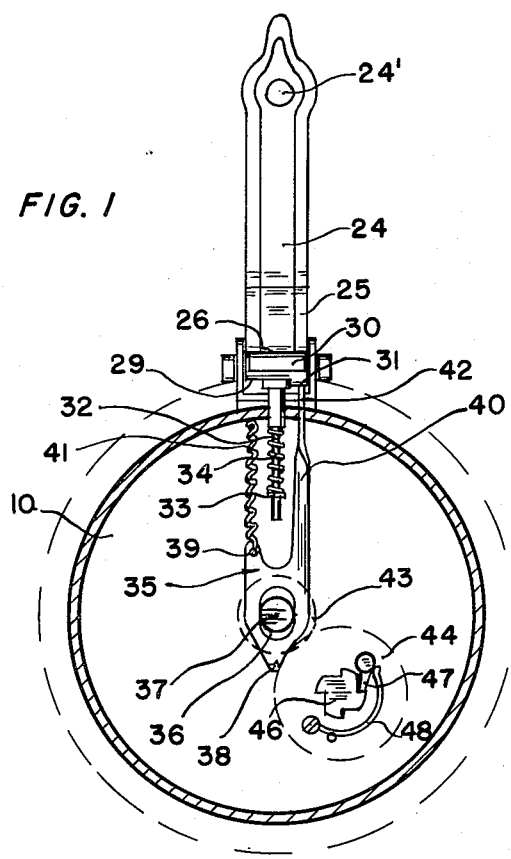
Fig. 1 is a vertical sectional view of a fishing reel embodying my invention, taken in the plane of the line 1—1 of Fig. 2, showing the hinged control member in line retrieving position.

The preferred form of fishing reel embodying my invention comprises a shallow cup shaped housing 10 and a removable cover 11 provided with a cut away portion or slot 12 which extends from the center of the cover radially and continues to and through the peripheral wall 13 of the cover 11. Within the housing 10, 11, is a spool 14 which consists of plates 15 and 16, provided with spaced annular line retaining walls 17.

A line guide and control member 24 in the form of a flat strap is bent between its ends and provided with a grommet 24'. The end 25 is hinged to the housing cover 11 by means of a cam 26 connected to the part 25 of the line control member 24, the cam being rotatable about the pin 27 fixedly mounted on the cover 11. The part 25 is provided with a finger hold 28 for actuating the hinged member 24.

The cam 26 is in the form of a relatively short round shaft, provided with a flat surface 29 and another flat surface 30. The cam surface 30 extends the length of the cam 26 between its ends, being parallel to the axis of the cam, whereas the cam surface 29 is shorter and terminates at the shoulder formed by the concentric portion 31 adjacent the end of said cam surface 29. The function of this cam 26 and its flat surfaces 29 and 30 will be explained hereinafter.

Figure 2:
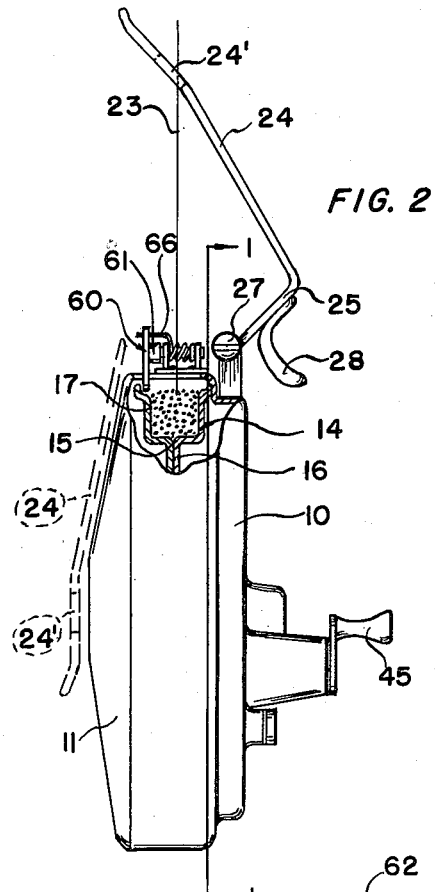
Fig. 2 is a peripheral elevational view of the same, showing the hinged control member in line retrieving position in full lines and in line casting position in dotted lines.

Referring to Figs. 1 and 2, it will be seen that when the line guide and control member 24 is in the casting position shown in dotted lines in Fig. 2, that is, with the portion 25 parallel to the peripheral surface 13 of the housing and the portion 24 engaging the housing 11, the flat or low cam surface 30 engages the flat top of a lock pin 32 which slides through a bearing 33 fixed to a bracket (not shown) mounted in the housing 10.

The lock pin 32 is under tension of the spring 34 which surrounds the pin 32 between the bearing 33 and the enlarged top of the pin, and thus the lock pin is urged into contact with the cam 26 at all times. When the line guide and control member 24 has been manually moved to retrieving position, as in full lines in Fig. 2, the flat or low cam surface 29 will be engaged by the upper end of the lock pin 32. The function of the lock pin is to retain the cam 26, and thereby the hinged control member 24, in either the casting or the line retrieving position.

The gear lock 35 is a relatively flat piece of metal provided with an elongated slot 36 adapted to have the spool shaft 37 extend therethrough. Said gear lock 35 is provided with a gear engaging tooth 38, a short arm 39 and a longer arm 40. A coiled spring 41 is connected to the arm 39 at one end and to a fixed part of the housing 10 at the other end. The gear lock arm 40 terminates in a cam bearing end 42. When the cam 26 has been moved with the line guide 24 to the casting position, the cam surface 30 will be engaged by the bearing end 42 of the gear lock arm 40, and when the cam 26 has been moved with the line guide 24 to the retrieving position, the round or high portion 31 of the cam will be engaged by the bearing end 42 of the gear lock arm 40 as shown in Fig. 1. Thus the tooth 38 is made to engage the gear 43 fixed on the spool shaft 37 for locking the gear against rotation for casting purposes and the tooth 38 is made to disengage the gear 43 to allow said gear to rotate the spool for retrieving purposes. When the reel is positioned for casting the gear lock is in contact with the flat of the cam 26 which allows the spring to urge the lock member 35 upwardly and to engage the tooth 38 in the spool gear.

The spool shaft 37 and gear 43 are driven through a gear 44 mounted in the casing in any suitable manner, the gear 44 being actuated by the handle 45 operatively connected with said gear 44. The gear 44 can rotate only in a clockwise direction for the purpose of rewinding the line 23 on the spool 14 by rotating the spool. The mechanism for preventing counter-clockwise movement of the gear 44 and spool 14 comprises a ratchet 46 fixed on the face of the gear 44, a pawl 47 pivotally mounted on the gear in juxtaposition to the ratchet, and a spring 48 for bearing on the pawl. The pawl 47 is under constant spring pressure and therefore engages the ratchet 46, allowing the gear 44 to turn only in a clockwise direction.

The parts described are substantially the same as those heretofore shown, described and claimed in my aforementioned application. The additional line control means which constitutes the subject matter of this application comprises a curved arm 60 pivotally mounted midway between its ends on a plate attached to the peripheral wall 13 of the housing cover 11. Preferably the arm 60 is made integral with a collar 61 and shaft 62 but these parts may be made separately and then be rigidly connected together. The shaft 62 is rotatably mounted in spaced apart apertured ears 63, 63, rigidly connected to or integral with a plate 64 curved to fit the housing wall 13 and riveted thereto. The pivoted arm 60 is provided with a spool engaging finger 65 at one end. Its opposite end 67 is urged into raised position relatively to the plate 64 by a spring 66 which is coiled around the shaft 62 and extends through the apertured end 67 of the arm 60.

It is convenient to stamp the plate 64 and ears 63, 63 out of a flat piece of metal and to bend the ears upwardly after they have been apertured to form the means for rotatably mounting the shaft 62 therein.

Operation: From the foregoing it will be clear that the line guide or control 24 is moved manually by the fisherman to either casting or retrieving position as required. In casting position, it embraces the casing member 11, and the line 23 passes through the space between spool flanges, into the space between the spool and slotted housing 11, to emerge through the central part of the slot 12 and grommet 24' of the hinged line control 24.

In this position of the hinged line control 24, the cam 26 is engaged by the lock pin 32 bearing on the cam surface 30, and at the same time the cam surface 30 is engaged by the gear lock arm 42. Under influence of the spring 41, the gear lock 35 is in its raised position, wherein the tooth 38 engages the gear 43 and prevents its rotation and consequently also prevents rotation of the shaft 37 and spool 14. At the same time, the pivoted line control arm 60 will be in a position shown in Fig. 3, wherein the hinged control member 24—25 presses downwardly on the spring engaged portion of said arm and raises the finger 65 out of spool engaging position. Thus, during the casting operation, the line 23 "rolls off" the spool freely and without friction as is desired to easy casting, and without rotation of the spool or gearing.

Figures 3, 4, 5:
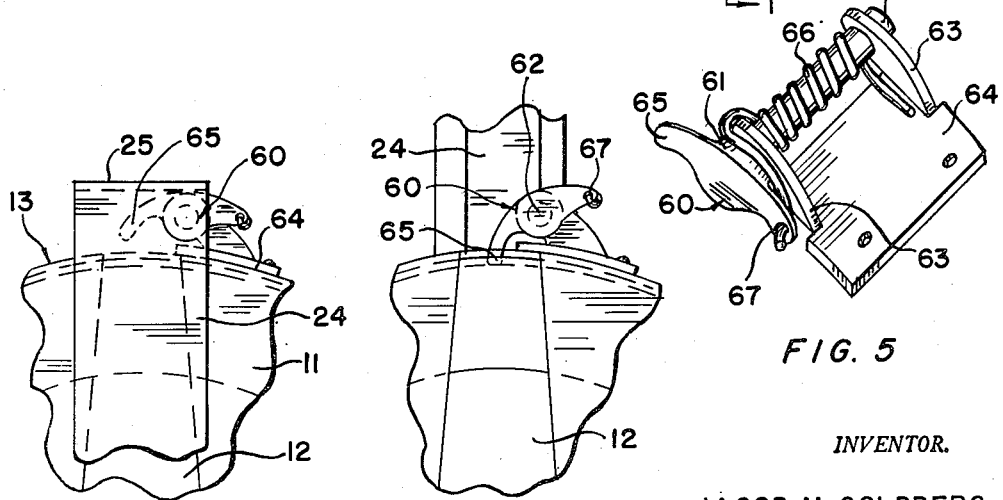
Fig. 3 is an elevational view of part of the reel showing my new pivoted line control mechanism mounted on the housing, between said housing and hinged control member, the latter being in casting position.
Fig. 4 is a view similar to that of Fig. 3 showing the same parts when the hinged control member has been moved to line retrieving position.
Fig. 5 is a perspective view of the pivoted line control mechanism detached from the reel housing.

When the fisherman desires to retrieve the line 23, he moves the line control 24 to the extended position shown in Figs. 1, 2 and 4, wherein the line 23 is drawn out in a radial direction from the spool 14. In this position of the hinged line control 24, the cam 26 is engaged by the lock pin 32 bearing on the low cam surface 29 and at the same time the high cam surface 31 is engaged by the arm 42 of the gear lock 35. The cam thus forces the gear lock 35 downwardly with respect to the shaft 37 which extends through the elongated slot 36, and the lock tooth 38 is disengaged from the gear 43. This leaves the gear free to rotate, but only in a clockwise direction due to the presence of the ratchet and pawl control as heretofore described.

During this retrieving period, the pivoted line control arm 60 will assume the position shown in Fig. 4, wherein the raising of the hinged control member 24 permits the spring 66 to urge the apertured end 67 of the pivoted arm 60 upwardly and forces the finger 65 downwardly into engagement with the inner surface of the flange 17 of the spool 14, whereby the line 23 is prevented from uncoiling over the side of the spool and is confined to movement in a radial direction toward the grommet 24' in the hinged control member 24.

Changes may be made in details of construction and in the form of parts without departing from the scope of my invention as set forth in the appended claims.

I claim:

1. In a fishing reel provided with a line carrying spool and a housing for the spool, said housing comprising opposite side walls connected by a peripheral wall, one of said side walls and the peripheral wall having a slot therein through which a line can be withdrawn from the spool, the combination of a line guiding hinged control member mounted on the housing and manually movable to casting position wherein the hinged control member extends across the peripheral wall and engages the slotted portion of the housing, or to line retrieving position wherein it extends radially away from the housing, and a second line control member pivotally mounted on the peripheral wall of the housing between the spool and said hinged control member, said second control member comprising an arm engageable with the spool, a portion engageable with the hinged control member, and means for automatically urging the arm into spool engaging position when the hinged control member is in its line retrieving position and out of engagement with said second control member.

2. In a fishing reel provided with a line carrying spool and a housing for the spool, said housing comprising opposite side walls connected by a peripheral wall, one of said side walls and the peripheral wall having a slot therein through which a line can be withdrawn from the spool, the combination of a line guiding hinged control member mounted on the housing and manually movable to casting position wherein the hinged control member extends across the peripheral wall and engages the slotted portion of the housing, or to line retrieving position wherein it extends radially away from the housing, and a second line control member pivotally mounted on the peripheral wall of the housing between the spool and said hinged control member, said second control member comprising a curved arm having a spool engaging finger at one end, a portion engageable with the hinged control member, and a spring connected to the housing and to the end of the curved arm opposite said spool engaging finger for automatically urging the arm into spool engaging position when the hinged control member is in its line retrieving position and out of engagement with said second control member.

3. A fishing reel comprising a line carrying spool, a housing for the spool, said housing having opposite side walls connected by a peripheral wall, one of said side walls and the peripheral wall having a slot therein through which a line can be withdrawn from the spool, a line guiding hinged control member mounted on the housing and manually movable to casting position wherein the hinged control member extends across the peripheral wall and engages the slotted portion of the housing, or to line retrieving position wherein it extends radially away from the housing, a drive gear mounted in the housing operatively connected with the spool, gear locking means in the housing, means actuated by the hinged line control member for moving said gear locking means into gear engagement when the hinged control member is in casting position and out of gear engagement when the hinged member is in retrieving position, and a second control member pivotally mounted on the peripheral wall of the housing between the spool and said hinged control member, said second control member comprising an arm engageable with the spool, a portion engageable with the hinged control member, and means for automatically urging the arm into spool engaging position when the hinged control member is in its line retrieving position and out of engagement with said second control member.

JACOB M. GOLDBERG.

REFERENCES CITED

The following references are of record in the file of this patent:

UNITED STATES PATENTS

| Number | Name | Date |
| --- | --- | --- |
| 1,150,575 | Blodgett | Aug. 17, 1915 |
| 2,179,413 | Kolosso | Nov. 7, 1939 |

FOREIGN PATENTS

| Number | Country | Date |
| --- | --- | --- |
| 813,087 | France | Feb. 15, 1937 |